(No Model.) 6 Sheets—Sheet 1.
E. G. SHORTT.
AIR BRAKE VALVE MECHANISM.
No. 538,552. Patented Apr. 30, 1895.
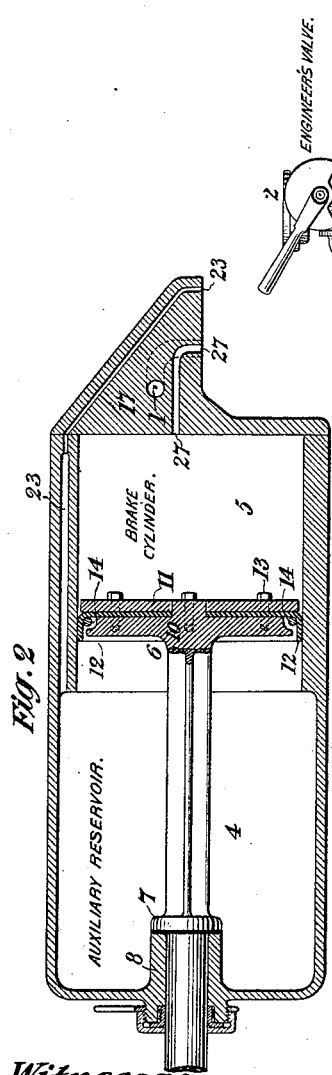
Witnesses:
Raphaël Netter
Robt. F. Gaylord
Inventor:
Edward G Shortt,
by Duncan & Page
Attorneys.

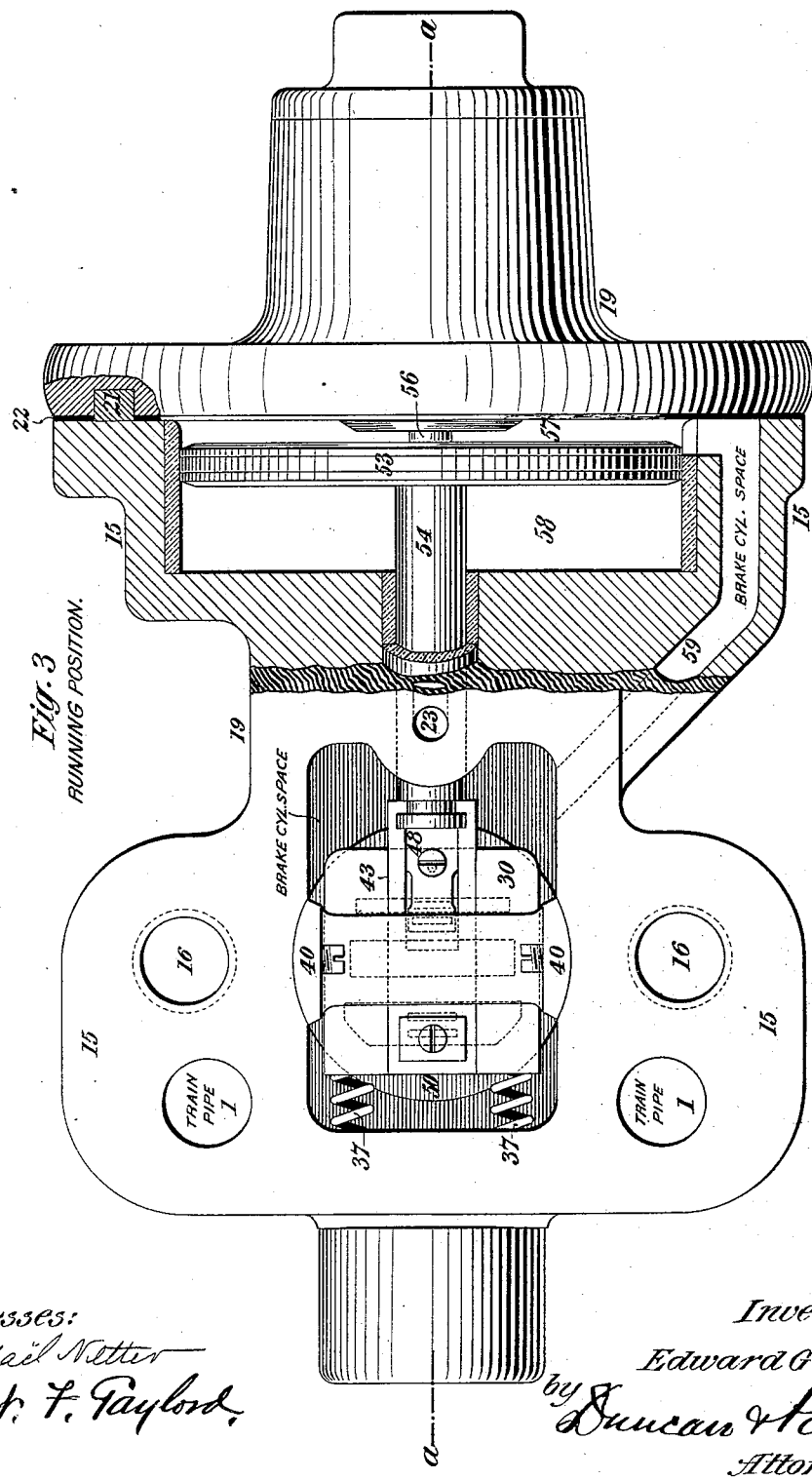

(No Model.) 6 Sheets—Sheet 3.

E. G. SHORTT.
AIR BRAKE VALVE MECHANISM.

No. 538,552. Patented Apr. 30, 1895.

RUNNING POSITION.

Witnesses:
Raphaël Netter
Robt. F. Gaylord

Inventor:
Edward G. Shortt,
by Duncan & Page
Attorneys.

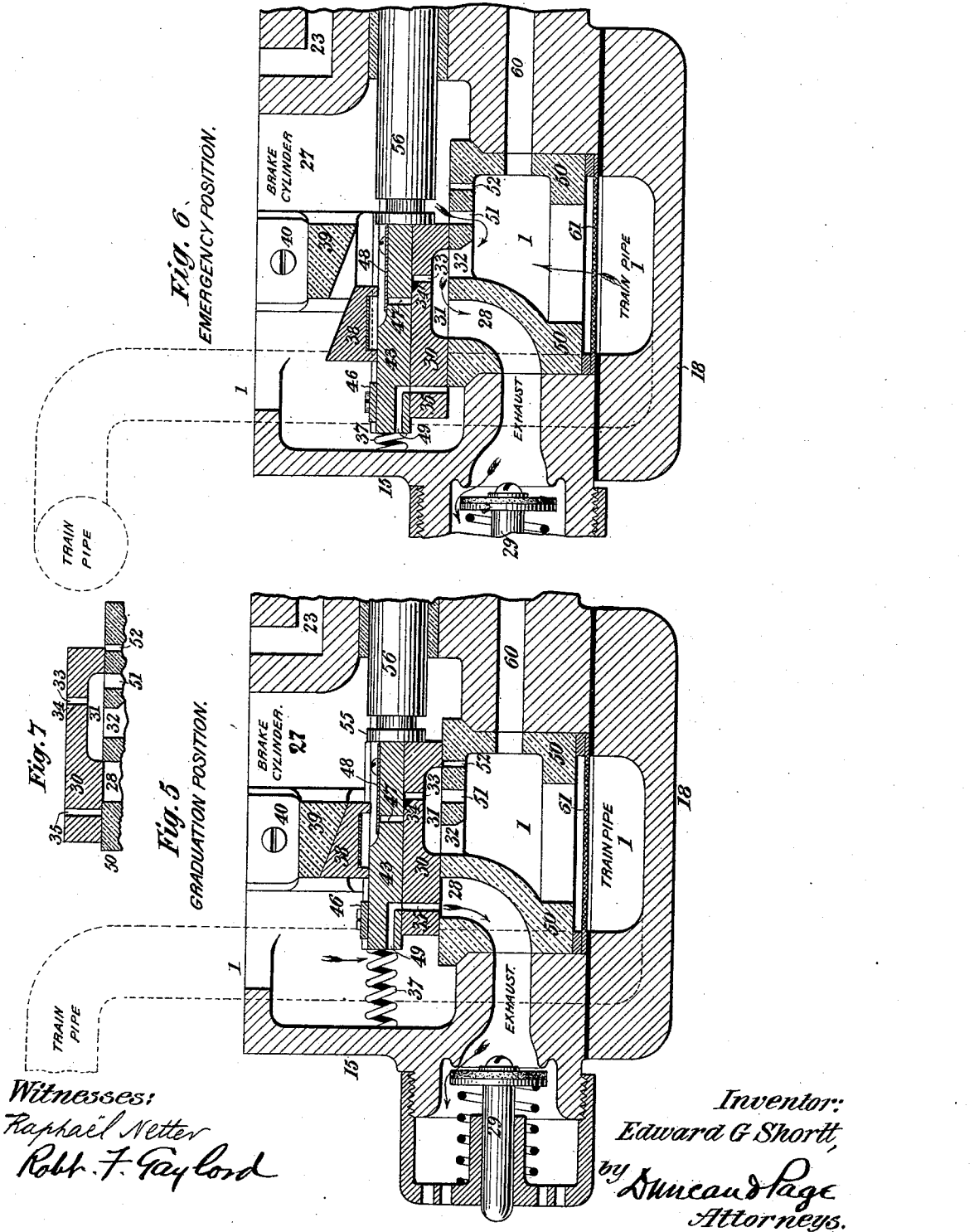

(No Model.) 6 Sheets—Sheet 5.

E. G. SHORTT.
AIR BRAKE VALVE MECHANISM.

No. 538,552. Patented Apr. 30, 1895.

RELEASE POSITION.

Witnesses:
Raphaïl Netter
Robt. F. Gaylord

Inventor
Edward G. Shortt
by Duncan & Page
Attorneys.

(No Model.) 6 Sheets—Sheet 6.
E. G. SHORTT.
AIR BRAKE VALVE MECHANISM.
No. 538,552. Patented Apr. 30, 1895.
*Fig. 9*     *Fig. 11*     *Fig. 13*
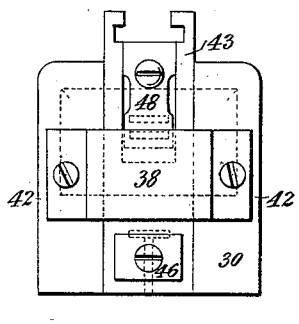
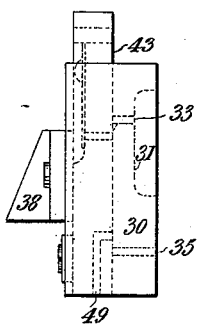
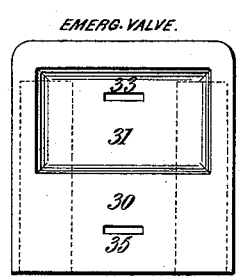
*Fig. 10*     *Fig. 14*
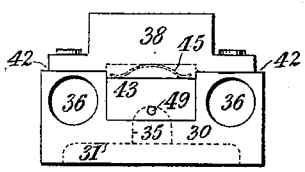
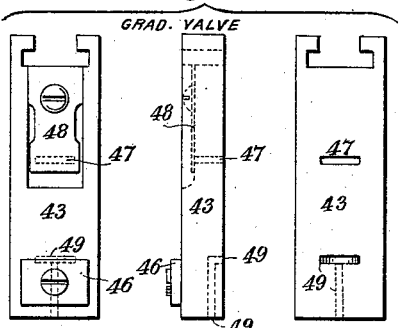
*Fig. 12*     *Fig. 15*
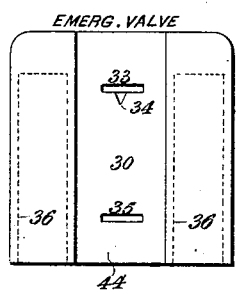
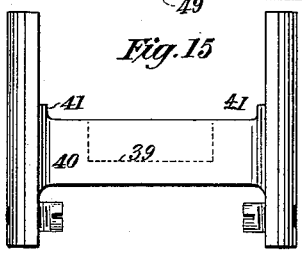
*Fig. 16*
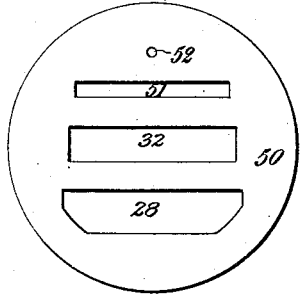
Witnesses:
Raphail Netter
Robt. F. Gaylord
Inventor:
Edward G. Shortt,
by Duncan Hage,
Attorney

UNITED STATES PATENT OFFICE.

EDWARD G. SHORTT, OF CARTHAGE, ASSIGNOR TO CHARLES GOODWIN EMERY, TRUSTEE, OF NEW YORK, N. Y.

AIR-BRAKE VALVE MECHANISM.

SPECIFICATION forming part of Letters Patent No. 538,552, dated April 30, 1895.

Application filed January 15, 1895. Serial No. 535,018. (No model.)

*To all whom it may concern:*

Be it known that I, EDWARD G. SHORTT, of Carthage, in the county of Jefferson and State of New York, have invented certain new and useful Improvements in Air-Brake Valve Mechanism, of which the following is a description, reference being had to the accompanying drawings.

This invention relates particularly to valve mechanism for controlling and variously operating the train pipe, brake cylinder and auxiliary reservoir of an equilibrio air-brake mechanism. The leading or predominate functions of this mechanism, are to control the operative or air pressure as between the train pipe, cylinder and reservoir, each with relation to each of the others; to open and close the train pipe as to local exhaust; to open and close the cylinder as to local exhaust; to open and close the reservoir as to exhaust into or equalization with the train pipe and cylinder; and to effect recharging of the cylinder and reservoir, and maintain a running feed thereto.

Figure 4:
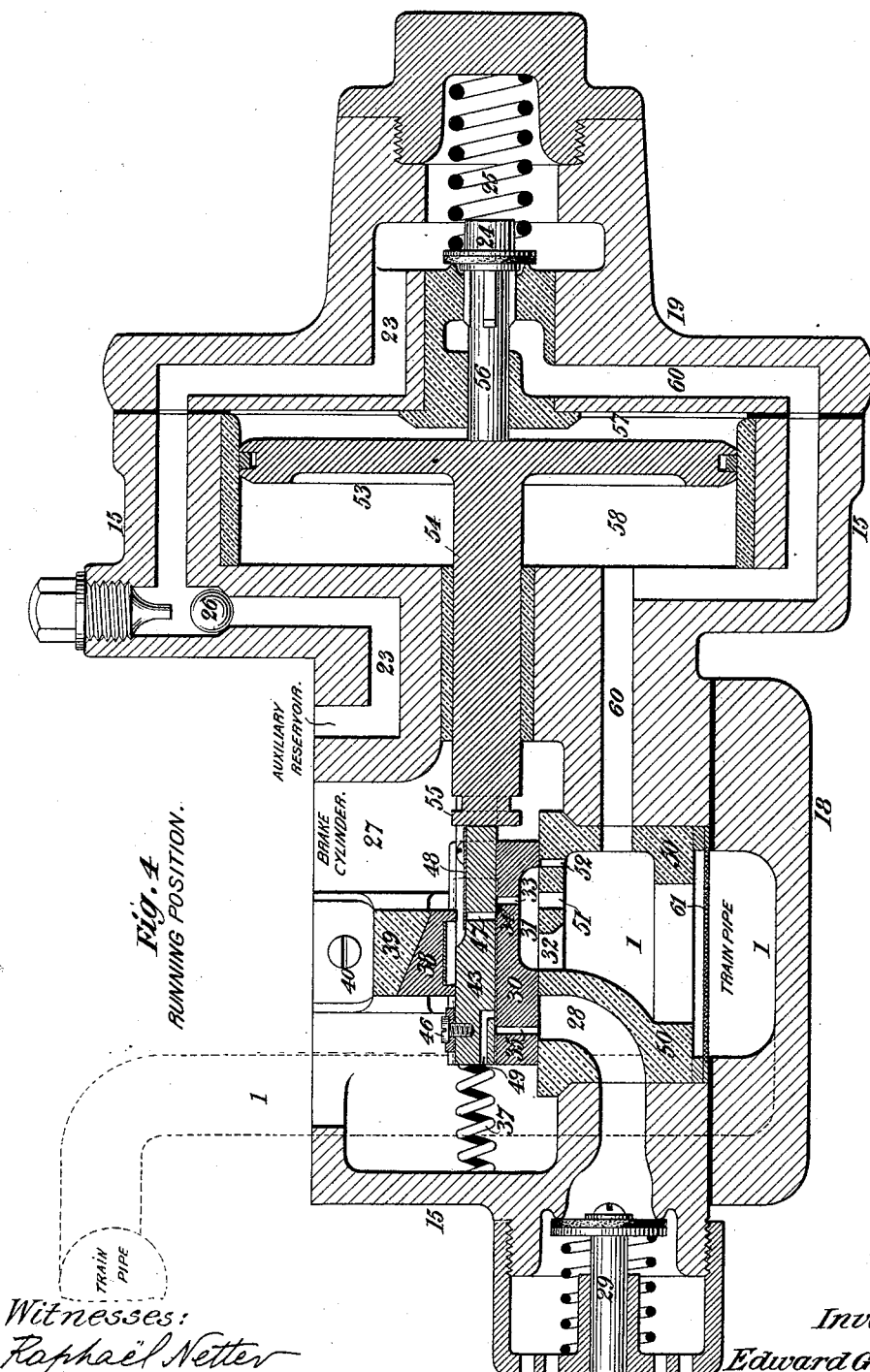
Figure 8:
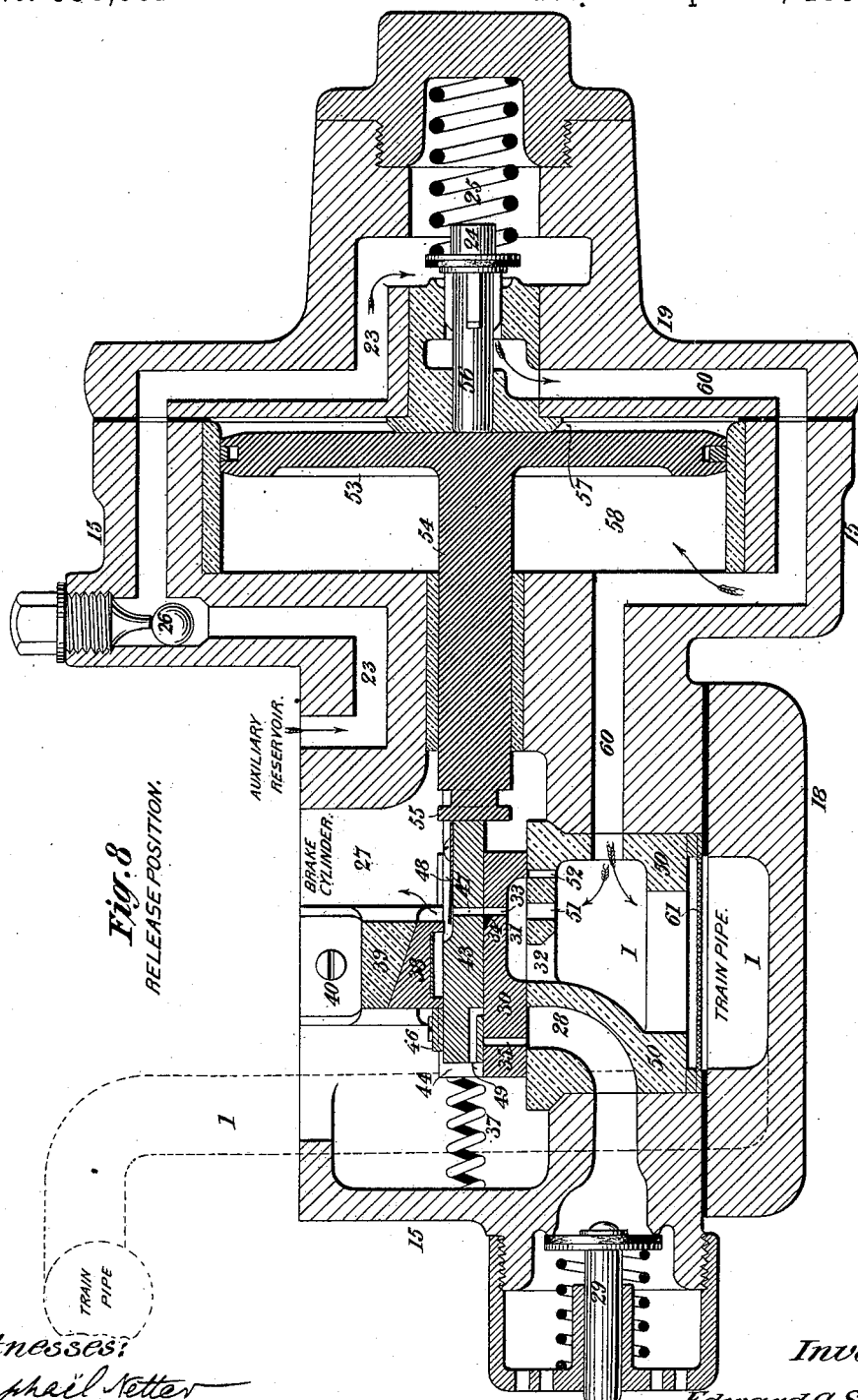

In the drawings, Figure 1 is a general diagrammatic view of an air-brake mechanism embodying my improvements. Fig. 2 is an enlarged detail view of the brake-piston and cylinder in horizontal central section. Fig. 3 is a plan view, in partial section, of the cylinder, reservoir, and train-pipe valve mechanism, showing the same as disconnected from the cylinder and viewed as from above in Fig. 1. Fig. 4 is a central vertical section of this mechanism on plane *a a* of Fig. 3 and looking from below or against the upper half thereof, the movable parts being in running position. Figs. 5 and 6 are similar sections with said parts in, respectively, graduation and emergency positions. Fig. 7 is a detail section showing one position of the emergency-valve during its closing movement. Fig. 8 is a view like Fig. 4, except that the parts are in release position. Fig. 9 is a rear elevation face view from the cylinder side of the emergency and graduation valves, Figs. 10 and 11 being end and side views of the same. Fig. 12 is a similar view of the emergency-valve standing alone, Fig. 13 being a view of the same from the train-pipe side thereof. Fig. 14 shows a face view of the graduation-valve from the cylinder side and a side view and a face view from the train-pipe side. Fig. 15 is an elevation view of a bridge-piece or valve-seating device. Fig. 16 shows the emergency-valve seat as seen from the cylinder side.

In the views, 1 indicates the train pipe; 2, the engineer's valve; 3, the main reservoir; 4, the auxiliary reservoir; 5, the brake cylinder; 6, the brake piston and its angular rod; and 7 a stop on the rod which, by striking the stuffing box 8, limits the release motion of the piston as shown.

The brake piston is composed of the head 10 and disk 11, both of diameter less than that of the cylinder, and between which is held the cup or valve packing 12, turned toward the reservoir space, the disks being firmly held together by bolts 13. Under the cup packing is arranged an expansible ring-spring 14 acting to hold the packing against the cylinder and thereby assist in preventing air from the reservoir passing the packing and entering the cylinder, but yielding to permit air to enter the reservoir from the cylinder when at certain pressure above reservoir pressure. This packing and spring are also to be so adjusted that, with equal air pressure on both sides of the piston, the variation between the pressure areas on the opposite sides of the piston, together with the resistance of the cup or valve packing against opening, will cause the piston when in application position to be moved to release position by a power sufficient to properly overcome the release resistance of the brakes. When, however, the piston comes to rest in release position, the valve will open to permit practically the equalization of pressures in the reservoir and cylinder.

Referring now to the valve mechanism, 15 indicates the casing thereof, which is fastened by bolts 16 (Fig. 1), to the bracket neck 17 of the cylinder, the bottom plate 18 being held to place on the casing by the same bolts. The cap plate 19 is fastened to the casing by screw bolts 20, bosses 21 (Fig. 3) serving to positively define the position of the plate and yet permit the presence and proper compression of a packing ring 22. In the bracket neck is a passage 23 leading from the reservoir and to the reservoir storage valve 24 normally seated by a spring 25 and holding the passage closed against the flow of air from the reservoir; and in this passage is also located the retaining or check valve 26 acting under flow of air from the reservoir to open the passage but closing it as to flow of air to the reservoir.

27 is a passage openly communicating with the brake cylinder; and 28 is an exterior exhaust port for the train pipe and cylinder, valve 29 normally held closed under slight spring pressure being provided to prevent inrush of air or the collection in the port of foreign material.

30 (see especially Figs. 9 to 14) is the emergency valve, which is of plate-like form and contains the emergency passage 31 adapted upon suitable movement of the valve to openly and fully connect the train pipe port 32 with the exhaust port 28 (Fig. 6). It also is pierced by the cylinder charging passage 33, which opens at the inner or cylinder end thereof into the contracting notch or feed passage 34 (Fig. 12); and, by the graduation passage 35 which opens into the external port 28 when this valve is in running position. Spring barrels 36 are formed in the sides of the valve and hold springs 37 (Figs. 4 to 8) the lower ends of which rest on the valve casing and which serve to hold the valve in running position as also to return the same to such position when not opposed by a superior force. This valve carries the cam or wedge block 38 which, when the valve is in running position, bears against the bevel 39 on the bridge piece 40 fixed to the casing and thereby forces the valve under stress of its springs to tight contact with its seat. Shoulders 41 on this bridge engage the edges 42 of the valve and insure it not rising from its seat when its wedge is moved from under the bridge.

43 is the graduation valve, which also is of plate-like form and is carried in a horizontal groove seat 44 in the emergency valve, it being held tightly to contact on its seat by the wedge block 38 and by the leaf spring 45 held in a recess in said block; also it carries the shoulder piece 46 (omitted from Fig. 10) which is located so as to engage said bridge and thereby the emergency valve, whereby the latter will be moved with the graduation valve, as in case of the absence or inefficient operation of the emergency valve springs. It is pierced by the charging passage 47 so located as to fully open the charging passage 33 of the emergency valve to the cylinder in position of full release (Fig. 8), and so as to partially open the same through feeding notch 34 in position of running, (Fig. 4,) which charging passage is covered on the cylinder side of the valve by a flat plate or tongue spring 48 acting by its tension to regulate when in open position the operative size of the feeding and charging passages to the cylinder, and to hold the passages closed to prevent a flow of air from the cylinder; and it also has the graduation passage 49, which is so located that in graduation position (Fig. 5) the said feeding and charging passages are closed and this graduation passage is opened through the graduation passage 35 in the emergency valve to the exhaust port 28, and is also located so that in running position (Fig. 4) it is closed by the emergency valve.

The valve seat 50 (see especially Fig. 16) is provided with the train pipe emergency exhaust ports 32 and 28 already described, as also with the cylinder emergency exhaust port 51 through which the cylinder at the time of an emergency application is fully and quickly exhausted through said port 32 to the outer exhaust port 28. Also it is provided with the small, cylinder vent port 52 through which cylinder air can escape into the train pipe during the closing action of the emergency valve and while the valve is moving to close the outer exhaust port and has by such movement closed the cylinder exhaust port 51, this vent port being not closed by the valve until after the outer exhaust port has been closed and the graduation passages opened or very nearly so, whereby it is assured that air under pressure will not be trapped in the cylinder space, at least under such pressure as to materially oppose the closing movement of the valve. See the detail section of Fig. 7 which illustrates this action of the valve during its closing movement.

53 indicates the piston, diaphragm or movable abutment which actuates the said graduation, emergency, and storage valves, the stem 54 of which piston is attached by the grooved head 55 to one end of the graduation valve, and is of such length that, in running position, where the piston bears against the spring supported storage valve stem 56 projecting air tight through its seat, it holds the graduation valve closed as to cylinder exhaust but open as to train pipe feed. This piston is movable air-tight between the chambers 57 and 58, which chambers respectively openly communicate on the cylinder or right-hand side of the piston with the brake cylinder through passage 59 (Fig. 3), and on the train pipe or left-hand side with the train pipe and that side of the storage valve by passage 60.

61 indicates a screen located in the train pipe passage and between the bottom plate 18 and the valve seat 50. This position of the screen, close to the valve ports where expansion and compression of air is most active and variations thereof most felt, results in keeping the screen free from collections that tend to lodge in its meshes and obstruct the free flow of the air.

When the parts are in the running position, the train pipe, cylinder, reservoir and valve piston chambers contain air at practically uniform pressure. The charging passages from the train pipe to the cylinder are reduced by the position of the valves to the size of the feed passage, the operative size of which is in turn adjustably reduced to the smallest size then needed by the spring feed valve, which insures that, during the flow of feeding air, the valve piston will be held in running position by the cylinder air being maintained at slightly lower pressure (at least, at not a greater pressure) than that of the train pipe air. The action of this valve also insures that the pressure in one cylinder of the train line will not essentially vary from that in another cylinder, since each cylinder feed valve, in practical effect, and by its tension and the cylinder pressure, graduates its own feed in accordance with the demand of its cylinder to equalize with all other cylinders. Thus maintaining in the train pipe a pressure higher than that of the cylinders connected therewith, prevents the brakes creeping on, as well as prevents other undesired actions due to slight variation in train pipe pressure because of leakage, irregular feed, the action of the air compressing pump, &c.

If the train pipe pressure be raised, especially if suddenly and materially above the usual feed flow, then the train pipe pressure will move the valve piston to first lift the storage valve, and by further movement thereof to bring the graduation valve to a position where the charging passages will be fully opened, thereby permitting any excess of local or auxiliary reservoir air over train pipe pressure to flow to the train pipe side of the piston valve and thence to the train pipe and cylinder, the storage valve being held open until equalization has been established and the said piston thereby and by the storage valve spring returned to running position. The check valve in the reservoir passage permits flow from the reservoir, but prevents flow from the train pipe, particularly in case of opening the storage valve under train pipe pressure when the reservoir pressure is below that of the train pipe, in which case the reservoir would be recharged through the charging passage, the cylinder, and by the brake piston, until equalization be effected and the valve piston be returned to running position as before.

It is to be noted that the charging or feeding valve, or feed and charge passage controlling spring, acts to control or regulate the operative size of the passage from its maximum to its smallest available size of opening; that it is continuously acting in running condition to preserve a pressure in the train pipe slightly greater than that in the cylinder, and that thereby a practically uniform pressure will be maintained in all parts of the system, varied only by the controlling action of the various feed valves of the system. Further, it is to be noted that the charging passage, when acting in its capacity to charge the cylinder at the time of effecting equalization, performs this function independently of the smaller feed passage, that the feed passage is independent of the charge passage, except that the latter serves as a part of the former; as also, that the feeding valve acts independently with these passages. While the functions and purposes of these passages, each acting with a spring, are independent, I prefer for simplicity of structure to combine them as described; and to locate them in the graduation and emergency valves, rather than in another part of the partition that separates the train pipe and cylinder spaces; also, it is to be noted, that the storage valve serves as a yielding abutment or support for the valve piston to rest against so that it will not be moved by slight variations of train pipe pressure, and insures the desired action of the feed valve in running position, the tension of the storage valve spring being sufficient to hold the piston against movement under a feed flow of practically the full capacity of the feed passage, and to return the piston from equalizing to running position when the equalizing flow has been reduced to the capacity of the feed passage.

When it is desired to make a graduation application of the brakes, the train pipe pressure will be reduced to below cylinder pressure, which will cause the piston and graduation valve to move to exhaust position, excessive movement of the graduation valve being prevented by the piston stem coming in contact with the emergency valve which is then strongly held to seat by its springs and the cylinder pressure thereon. At the time of making the train pipe graduation reduction, the feed valve closes instantly, if it be open, and prevents cylinder air escaping into the train pipe and lessening such reduction or opposing the prompt and effective movement of the piston; which action of the feed valve also assists in sharply and widely defining train pipe graduation reduction from train pipe emergency reduction. As the cylinder exhausts, the cylinder pressure on the piston decreases, which insures that no further application movement of the piston will be made. When the cylinder air is exhausted to a little below train pipe pressure, the piston will be returned to running position by train pipe pressure, and another similar application can at once be made; and these applications can successively follow until the full breaking power is reached, without loss of reservoir air or effecting an emergency application.

After any one or more graduation applications, the brakes can be quickly released by properly increasing train pipe pressure, the charging ports being thereupon opened and the cylinder recharged and its pressure equalized with that of the train pipe and reservoir; and promptly after such recharge and release re-application, either graduation or emergency, can be made.

To effect an emergency application, the train pipe pressure will be suddenly and materially reduced, whereupon the feed valve will close, and the valve piston and graduation valve will have free motion for a short distance so that the piston stem will be brought into forcible impact contact with the emergency valve and move it, to cover the graduation passage through it, and to position where, with the piston at the left hand end of its chamber or at the limit of its stroke in this direction, the emergency valve passage will first open the train pipe fully through its larger port to the exterior exhaust port, and then this valve will uncover the smaller cylinder emergency exhaust port, whereby train pipe air, and then train pipe and cylinder air, are freely and rapidly exhausted. The cylinder port is smaller, in relative exhausting capacity, than is that of the train pipe, and hence it is insured that the cylinder air will not flow into the train pipe so as to effect the rapidity of travel along the pipe of the emergency reduction impulse. When the cylinder air has exhausted, the emergency valve spring will return the emergency valve to running position, the graduation valve remaining in graduation position, which movement of the emergency valve first causes it to close the cylinder exhaust port, and then the train pipe exhaust port, the cylinder vent port permitting air to escape from the cylinder and preventing any accumulation of air under pressure upon the cylinder side of the piston, and the graduation port acting similarly when the vent port is covered. Upon properly recharging the train pipe, the valve piston is moved to close the graduation exhaust port, then to open the reservoir storage valve, and then to open the charging passage, which will result in prompt equalization between the reservoir, train pipe and cylinder, as explained, and the consequent release of the brakes. Thus opening the storage valve before the charging passages are opened, insures that the piston will be held in the release position during equalization, the spring valve also co-operating to produce this action, which is further insured by the reservoir passage being larger than the feed passage. Upon moving the valve piston to effect the release of the brakes, and if the reservoir pressure is lower than train pipe pressure, equalization will wholly occur through the cylinder, and the release movement of the brake piston will not be delayed, as would be the case if the higher train pipe pressure were at the time of release action permitted to equalize with the lower reservoir pressure through the reservoir passage. It will be seen, therefore, that whatever the reservoir pressure at time of release action, the first result of such action is the establishment of release pressure on the brake piston.

On trains of maximum length, two successive emergency applications can be readily made by such mechanism, and on passenger trains of average length, as many as six, without recharging the auxiliary reservoirs.

In case the emergency valve spring be removed or disabled, and the emergency valve be not returned to closed position after the cylinder has exhausted, and if there is not a large number of cars in the train, then a quick recharge of the train pipe will cause the valve piston to move to close the emergency valve by the graduation valve engaging the same.

In the case of the cylinders of the train line being differently charged, as when adding cars to a train, the result will be to equalize the pressure of the train pipe of the part of the train of high pressure with the pipe, cylinders and reservoirs of the part of lower pressure, and at the same time to effect an application on the part of higher pressure, after which the whole line will equalize uniformly upon release or recharging action, the essential point being, that such or similar variations of train pipe pressure result in only one application, followed by equalization of pressure throughout the system upon releasing the brake or brakes thus applied.

By the term "equilibrio" air brake mechanism, is meant a brake mechanism the brake actuating device or piston of which normally sustains reservoir or brake-actuating pressure, and is controlled by an opposing, or train pipe, pressure.

What is claimed as new is—

1. In combination in an equilibrio air-brake mechanism, a brake piston and cylinder connected on one side of the piston with an auxiliary reservoir and on the other side thereof with a train pipe, a reservoir charging passage from one side to the other of said piston and valved to retain reservoir air, an equalizing passage from the train pipe to the reservoir, a valve acting to normally hold said passage closed against reservoir pressure, and a valve acting to hold the passage closed against train pipe pressure.

2. In combination in an equilibrio air brake mechanism and with the train pipe, brake cylinder and auxiliary reservoir thereof, a valved passage from the cylinder to the reservoir, a valved passage from the reservoir to the train pipe, and mechanism operating by an increase in train pipe pressure to equalize air pressures through the cylinder when a reservoir pressure lower than train pipe pressure obtains and acting to effect through said reservoir passage equalization of air pressures when a train pipe pressure lower than reservoir pressure exists.

3. In combination with the brake cylinder and train pipe of an equilibrio air-brake system, a feed valve controlling a passage from the train pipe to the cylinder and acting to retain cylinder pressure, a cylinder exhaust valve and mechanism for operating said valve which is oppositely acted on by train pipe and cylinder pressure, whereby a reduction of train pipe pressure will close said feed valve and open said exhaust valve, and the consequent reduction of cylinder pressure will cause the exhaust valve to close, for the purpose of producing a graduation application of the brakes.

4. In combination in an equilibrio air-brake mechanism and with the brake cylinder, auxiliary reservoir and train pipe thereof, a valve acting to control an exhaust port from the cylinder, a valve controlled passage from the reservoir to the train pipe, a valve operating mechanism acting to open the said cylinder valve under the action of a reduction of train pipe pressure and to open the valve of the reservoir passage by an increase of train pipe pressure, whereby a partial application of the brakes is produced and upon release movement the reservoir air is equalized with that of the train pipe and cylinder.

5. In combination with the brake cylinder, auxiliary reservoir, and train pipe of an equilibrio air-brake mechanism, a valve controlling an exhaust port from the train pipe and a valve controlling an exhaust port from the cylinder, a passage from the reservoir to the train pipe and a spring supported valve controlling such passage, and valve operating mechanism held in normal position against said reservoir passage valve and acting upon decrease of train pipe pressure to open said cylinder or said train pipe valve and upon increase of train pipe pressure to open said reservoir passage valve.

6. In combination in an equilibrio air-brake mechanism and with the train pipe brake-cylinder and auxiliary reservoir thereof, a passage between said reservoir and the train pipe, a valve controlling said passage and operated upon by an increase of train pipe pressure to put the train pipe and reservoir to open communication, for the purpose of recharging the cylinder, and a check valve located in said passage and acting to prevent a train pipe pressure greater than reservoir pressure flowing into said reservoir.

7. In combination in an equilibrio air brake mechanism and with the train pipe, cylinder and auxiliary reservoir thereof, a valved passage from the cylinder to the reservoir whereby the latter is charged from the former, a passage from the reservoir to the train pipe and a valve and valve-operating mechanism controlling the same and operable under train pipe pressure to put the reservoir to open communication with the train pipe and through the same with the cylinder.

8. In combination with the brake cylinder and train pipe of an equilibrio air brake mechanism, a brake cylinder exhaust valve acting in running position to separate the train pipe from the cylinder and provided with a feed passage having a valve acting when in open position to control the operative size of the passage and to hold the same closed against cylinder pressure, a valve operating mechanism oppositely acted upon by variations between train-pipe and cylinder air pressure, whereby to effect a partial or graduated exhaust from the cylinder.

9. In combination in an equilibrio air-brake mechanism and with the brake cylinder and train pipe thereof, a graduation valve controlling an exhaust port from the cylinder, an emergency valve controlling an exhaust port from the cylinder and one from the train pipe, and valve operating mechanism acting under different train pipe reductions of pressure to move the graduation valve to exhaust the cylinder and to move the emergency valve to exhaust the train pipe and cylinder.

10. In combination in an equilibrio air brake mechanism and with the brake cylinder and train-pipe thereof, a graduation valve controlling an exhaust port from the cylinder, an emergency valve controlling an exhaust port from the cylinder and one from the train pipe, and valve operating mechanism oppositely acted upon by train pipe and cylinder air and moved by different train pipe reductions of pressure to open the cylinder to graduate exhaust or to open the train pipe and cylinder to emergency exhaust.

11. In combination in an equilibrio air-brake mechanism and with the brake cylinder and train pipe thereof, an emergency valve controlling an exhaust port from the cylinder and one from the train pipe, and a graduation valve seated on and having movement relatively to said emergency valve and controlling a graduation passage from the cylinder, and valve operating mechanism oppositely acted on by train pipe and cylinder pressure and moved by a train pipe reduction to open the cylinder to graduate exhaust and by a greater reduction to open the train pipe and cylinder to emergency exhaust.

12. In combination with an equilibrio air-brake mechanism and with the brake cylinder and train pipe thereof, an emergency valve controlling an exhaust port from the cylinder and one from the train pipe, and a graduation valve movably mounted thereon and controlling the graduation exhaust passage from the cylinder, and a movable abutment connected to said graduation valve and for independently operating said valves, the abutment normally having cylinder pressure upon one of the faces and train pressure upon the other of its faces.

13. In combination with a brake cylinder and train-pipe of an equilibrio air-brake mechanism, an emergency valve controlling an exhaust port from the train pipe and one from the cylinder, a graduation valve controlling a graduation passage from the cylinder, valve operating mechanism connected to the graduation valve and through the same to the emergency valve, and means whereby the graduation valve is first moved to graduation exhaust position and then both valves are moved to emergency position, and upon closing movement of the said valves the graduation valve engages the emergency valve and moves the same to closed position.

14. In combination with the brake cylinder and train-pipe of an equilibrio air-brake mechanism, a valve acting to control exhaust from the train pipe, a valve acting to control exhaust from the cylinder, a valve operating mechanism connected with and for operating said valves, and a spring support for holding the said mechanism and the said valves in normal or running position.

15. In combination with the brake cylinder, auxiliary reservoir and train pipe of an equilibrio air brake mechanism, a graduation valve controlling an exhaust port from the cylinder, an emergency valve controlling exhaust ports from the cylinder and train pipe, valve operating mechanism connected to and for operating said valves, a passage from the auxiliary reservoir to the train pipe controlled by a spring seated valve which also acts as a support to hold the said abutment and the said valves in normal or running position.

16. In combination with the brake cylinder and train-pipe of an equilibrio air brake mechanism, an emergency valve movable to first put the train pipe to exhaust and then to put the cylinder to exhaust through the train pipe space and the train pipe exhaust port, and mechanism acting to operate said valve by variation between train pipe and cylinder pressures normally maintained upon its opposite faces.

17. In combination with the brake cylinder and train pipe of an equilibrio air brake mechanism, a valve movable to put the train pipe and then the cylinder to full exhaust, a valve actuating mechanism operated by a variation of air pressures upon its opposite sides, and a vent port from the cylinder normally controlled by said valve and acting to prevent the accumulation of air pressure in the cylinder space during the closing movement of the valve.

18. In combination with the brake cylinder and train pipe of an equilibrio air brake mechanism, a valve movable to put the train pipe and cylinder to exhaust, a second or graduation valve movable to put the cylinder to exhaust through the other said valve, an exhaust passage from the cylinder controlled by said valves whereby accumulation of air pressure in the cylinder space upon closure of the valves is prevented, and mechanism for operating the said valves under variation of train pipe pressure.

19. In combination with the brake cylinder and train pipe of an equilibrio air brake mechanism, a partition closing communication between the train pipe and cylinder, a feed passage piercing said partition, and a spring valve located on the cylinder side of the partition and acting when in open position to control the operative size of the passage and to close said passage upon a reduction of train pipe pressure below cylinder pressure.

20. In combination with the brake cylinder and train pipe of an equilibrio air-brake mechanism, a partition closing communication between the train pipe and cylinder, a feed passage piercing said partition, and an elastic plate or tongue valve acting in open position to control the operative size of the passage and acting to close said passage against the escape of cylinder pressure.

21. In combination in an equilibrio air brake mechanism and with the brake cylinder and train pipe thereof, valve mechanism for exhausting the train pipe and cylinder, a piston operated upon its opposite faces by the cylinder and train pipe pressures, a passage from the train pipe to the cylinder and a valve independent of the said piston controlling the same, whereby upon the train-pipe reduction the said passage is closed and cylinder air is prevented from entering the train pipe.

22. In combination in an equilibrio air-brake mechanism and with the brake cylinder and train pipe thereof, a combined recharging and feeding passage between the cylinder and train pipe, and a spring valve controlling said passage and acting in open position to vary the operative size thereof, whereby for the purposes of feed, a small spring-regulated passage is obtained, and, for the purposes of recharging, a relatively larger spring-controlled charging passage is obtained.

23. In combination in an equilibrio air-brake mechanism and with the brake cylinder and train pipe thereof, an emergency and a graduation valve independently acting to exhaust the train-pipe or cylinder and a movable abutment normally having train pipe pressure upon one face and cylinder pressure upon the other face thereof, charge passages through said valves from the train pipe to the cylinder and located relatively to each other so that in running position the full carrying capacity of the passages is limited to a size suitable to effect the ordinary or running feed, and also located so that upon suitable movement of the said abutment the passages will be opened to their full conjoint capacity.

24. In combination in an equilibrio air-brake mechanism and with the brake cylinder and train pipe thereof, an emergency valve and graduation valve independently acting one to exhaust the train pipe and one to exhaust the cylinder, and a valve-supporting abutment normally having train pipe pressure upon one face and cylinder pressure upon the other face thereof, charge passages through said valves from the train pipe to the cylinder, and located relatively to each other so that in running position the full carrying capacity of the passages is limited to a size suitable to effect the ordinary or running feed, and also located so that upon suitable movement of the said abutment the passages will be opened to full capacity, and a spring valve controlling the operative size of the passage through the said graduation valve and acting under cylinder pressure to close the same.

25. In combination with the brake cylinder and train pipe of an equilibrio air brake mechanism, a graduation and an emergency valve closing communication between the train pipe and cylinder, a passage piercing the said valves and controlled as to its operative size by the relative movement of the valves, and an elastic plate or tongue located upon the cylinder side of said valves and acting to control the operative size of the said passage, whereby the size of the said passage, for the purposes of feed or for the purposes of charging, is automatically regulated by said valve.

26. In combination in an equilibrio air brake mechanism and with the train pipe and brake cylinder thereof, a valve controlling an exhaust port from the cylinder and one controlling an exhaust port from the train pipe, said valves being located between the train pipe and cylinder spaces and each provided with a charging passage located to communicate with that of the other, and means acting under train-pipe variation of pressure to move said valves relatively to effect the operative size of said passages.

27. In combination with the brake cylinder, reservoir and train pipe of an equilibrio air brake mechanism, a passage from the reservoir to the train pipe containing a valve acting normally to hold reservoir air and operable to open the passage to the train pipe, a cylinder exhaust valve acting in running position as a partition separating the train pipe and cylinder and provided with a feed passage having a valve acting to control the operative size of the passage and to close under cylinder pressure, a valve operating mechanism oppositely acted upon by maintained train pipe and cylinder pressure and movable under train pipe variation of pressure to open the exhaust valve and effect a partial or graduation exhaust from the cylinder and upon closing to open the reservoir valve and effect equalization of reservoir and train pipe.

EDWARD G. SHORTT.

Witnesses:
 JOHN UNSER,
 H. B. EDMONDS.